United States Patent Office 2,861,015
Patented Nov. 18, 1958

2,861,015

METHOD OF DESCALING TITANIUM

Robert A. Simon, Seattle, Wash., assignor to North American Aviation, Inc.

No Drawing. Application May 27, 1955
Serial No. 511,746

6 Claims. (Cl. 134—3)

This invention provides a bath whereby the surface of a titanium part which has received a heavy scale formation may be treated so that a brief acid pickle subsequently will remove all of the scale and leave the part completely satisfactory for use.

With the advent of titanium and its alloys as production metals numerous problems have resulted from a metal working standpoint. One of the difficulties results from the formation of a complex scale on the surface of titanium metal and its alloys when it has been subjected to heat such as in forming, heat treating or the like. This scale not only gives a poor appearance but it also interferes with inspection procedures, lessens the ductility of the metal and can interfere with welding. Removal of this scale therefore becomes imperative. It has been past practice to use an acid pickling bath to remove the scale after the parts have been subjected to heat. This was a passable solution to the problem while forming and heat treating of titanium remained at relatively low temperatures. However, now titanium parts are being subjected to temperatures up to 1100° F. and a heavier scale is formed of such character that all known acid pickles have proved to be unsatisfactory. In the first place where a part has been given a scale at a relatively high temperature it is necessary to leave it in the pickle for a considerable period of time which becomes a severe penalty from a production standpoint. Also, the active ingredients in the bath are rapidly depleted. Even more important, in removing scale in this manner an excessive amount of metal will be lost so that it becomes impossible to keep the work piece within prescribed tolerances. As much as 10 percent of the thickness of light gauge parts may be lost in descaling. Furthermore, the scale removal will be imperfect over the surface of the part, considerably more scale being removed from some portions than others.

It has been discovered that a hot caustic bath (containing sodium hydroxide) will condition the scale formed on a titanium part in such a manner that it will be easily removable in a subsequent acid pickle. Such a material, however, has the serious disadvantage of causing excessive hydrogen absorption whereby its use as a scale conditioning substance is prohibited. The resulting hydrogen embrittlement of the titanium part will so severely reduce its strength and service life that it cannot be tolerated for any structural parts.

It is therefore an object of this invention to provide a substance which will condition scale on titanium and its alloys so that it may be easily removed by pickling so as to leave a clean and smooth surface. Another object of this invention is to provide a substance which will condition the scale on titanium such that complete removal of the scale is obtained with a minimum of loss of metal thickness. Another object of this invention is to provide a material for conditioning the scale of titanium without undue hydrogen absorption. Yet another object of this invention is to provide a substance for conditioning the scale on titanium whereby the conditioning treatment and subsequent pickle can be effected in a short time so as to permit a completely feasible process from a production standpoint. An additional object of this invention is to prevent hydrogen embrittlement of titanium and its alloys resulting from chemical processes. These and other objects will become apparent from the following detailed description of this invention.

Basically, I have discovered that the presence of a free chromate or dichromate ion during a chemical reaction involving titanium or its alloys will inhibit hydrogen absorption, obviating hydrogen embrittlement. When applied to a scale conditioning bath, this principle allows the use of a caustic solution which thoroughly conditions the scale but with which hydrogen pickup becomes no problem.

A bath for this purpose which has proven to be particularly effective is as follows:

| Component: | Percent by weight |
|---|---|
| Sodium hydroxide, tech. | 50–55 |
| Sodium chromate, tech. | 1–1½ |
| Water, tap | Balance |

In the above solution the sodium hydroxide is the basic scale treating ingredient which attacks the scale in such a manner that it becomes porous and will allow acid in a subsequent pickling bath to penetrate to the surface of the metal beneath the scale. This permits the acid to destroy the bond between the scale and the metal so that the scale will fall off when a very small quantity of metal has been removed.

The sodium chromate is the constituent which makes use of this compound possible. The sodium chromate inhibits the hydrogen pickup whereby the solution of this invention effectively conditions the scale without causing hydrogen embrittlement. It has been found equally effective to use sodium dichromate for this purpose which has the advantage of commercial availability at low cost. It is the free chromate ions which apparently accomplish the inhibiting of the hydrogen absorption.

Potassium chromate or potassium dichromate may be substituted without loss of effectiveness. Chromate ions are again present to inhibit the hydrogen pickup. The higher price of potassium chromate and potassium dichromate restrict the use of these materials, however. Another material which provides free chromate ions, and therefore may be used with the caustic bath, is chromium trioxide. Thus an example of an effective bath is a titanium scale treatment bath comprised of approximately 50 percent by weight sodium hydroxide; 1 percent by weight of a material taken from the group consisting of sodium chromate, sodium dichromate, potassium chromate, potassium dichromate and chromium trioxide; and the balance of water.

The solution should preferably be maintained at just below its boiling point, say at around 270° F., so that the chemical action may be speeded up. At temperatures below 250° F. the action on the scale is so slow that it is not regarded as practical from a standpoint of a usable production material. At the boiling point the bath is, of course, quite effective, but becomes difficult to work with.

As far as the ingredients of the bath are concerned, it is preferred to keep the concentration of sodium hydroxide at a minimum of 40 percent by weight for maximum effectiveness. Sodium hydroxide is readily available commercially in a 50 percent solution, which is the normal concentration in the bath. If at much above 50 percent by weight, the sodium hydroxide tends to solidify at room temperature, so the solution then becomes more difficult to use. Therefore an embodiment of this invention is the use of a titanium scale treatment bath comprising a solution of approximately 40 to 50 percent sodium hydroxide, 1 percent by weight of a material taken from the group consisting of sodium chromate, sodium dichromate, potassium chromate, potassium dichromate, and chromium trioxide; and the balance water.

If a titanium or titanium alloy part which has a heavy scale on the surface thereof, resulting from high temperature heat treatment or forming, is soaked in the composition of this invention for from three to five minutes the scale may then be completely removed with an approximately five minute acid pickle.

From a production standpoint certain limits may be arbitrarily set for permissible loss of metal from the surface of a titanium part when removing the scale therefrom. A value which will permit precision metal forming operations is a limit of .25 mil on each surface of the titanium part. Such a loss of metal will reasonably assure that sheet of .016 inch thickness will remain within a tolerance of .002 inch, which amounts to 1 mil per surface of the part.

Similarly, limits may be established as to the amount of hydrogen which it is permissible for the part to absorb for any step where hydrogen may be released. For any descaling operation it is generally considered that hydrogen pickup exceeding .01 percent is excessive.

Experiments have shown that where the bath of this invention is used a hydrogen pickup of only around .002 percent may be expected, well within the limits set for permissible absorption. No bubbling is observable when the bath is used indicating that there is no formation of free hydrogen. It has also been found that a metal loss of only .1 mil per surface or under may be expected from use of this caustic-chromate bath plus the acid pickle.

The caustic-chromate scale conditioning material thus described has a particular advantage from production standpoint as a bath requiring negligible handling costs. It is necessary to install heated tanks for the conditioning bath so that the parts may be treated therein, but in operation this becomes merely another dip in the pickling process. A number of parts may be immersed collectively in a conditioning tank.

The basic discovery that the free chromate and dichromate ions will prevent hydrogen pickup when chemical reactions involving titanium are involved may have additional important applications. For example, it has been found that the chromate and dichromate ions will prevent hydrogen pickup for the etch forming, or "chemical milling," of titanium. This has been accomplished by the addition of chromium trioxide in the etchant used for the chemical milling process when titanium is involved. This will supply the needed chromate and dichromate ions. Hydrogen absorption, which was heretofore a serious problem, is prevented in this manner.

It is apparent from the foregoing, therefore, that I have provided a metal conditioning bath whereby scale can be easily and quickly removed from titanium or titanium alloy parts without harmful effect on the part itself. Over and above this I have discovered that free chromate and dichromate ions act as an inhibitor to hydrogen absorption where titanium is involved, and will preclude hydrogen pickup.

The foregoing detailed description is to be clearly understood as given by way of illustration only the spirit and scope of this invention being limited only by the appended claims.

I claim:

1. The method of conditioning titanium scale comprising immersing a scale-coated titanium part in a solution containing from about 40 to about 55 weight percent sodium hydroxide, from about 1 to about 1½ weight percent of a material taken from the group consisting of sodium chromate, sodium dichromate, potassium chromate, potassium dichromate and chromium trioxide, and the balance water, maintained at a temperature above around 250° F. and below the boiling point thereof.

2. The method of descaling a titanium workpiece comprising the steps of immersing such a workpiece in a scale conditioning bath comprised of an aqueous solution of from about 40 to about 55 weight percent sodium hydroxide, from about 1 to about 1½ weight percent of a compound selected from the class consisting of sodium chromate, sodium dichromate, potassium chromate, potassium dichromate, and chromium trioxide, and the balance being water, maintained at substantially 270° F., and subsequently immersing said workpiece in an acid bath for removing the scale therefrom.

3. The method of conditioning scale on a titanium workpiece comprising immersing said workpiece in an aqueous caustic solution containing an amount, sufficient to inhibit hydrogen absorption, of a compound selected from the class consisting of sodium chromate, sodium dichromate, potassium chromate, potassium dichromate, and chromium trioxide, said solution being maintained above about 250° F.

4. A method of conditioning scale on a titanium workpiece comprising immersing said workpiece in an aqueous caustic solution containing an amount of sodium chromate sufficient to inhibit hydrogen absorption, said solution being maintained above about 250° F.

5. A method of conditioning titanium scale comprising immersing a scale-coated titanium part in a solution containing approximately 40 to 50 weight percent sodium hydroxide, 1 percent by weight of a material selected from the group consisting of sodium chromate, sodium dichromate, potassium chromate, potassium dichromate and chromium trioxide; and the balance water.

6. A method of conditioning titanium scale comprising immersing a scale-coated titanium part in a solution containing substantially 50 weight percent sodium hydroxide, 1 weight percent sodium chromate, and the balance water.

References Cited in the file of this patent

UNITED STATES PATENTS

| | | |
|---|---|---|
| 1,572,848 | Porter et al. | Feb. 9, 1926 |
| 1,628,514 | Robinson | May 10, 1927 |
| 1,899,734 | Stockton | Feb. 18, 1933 |
| 2,194,498 | Dubpernell et al. | Mar. 26, 1940 |
| 2,676,900 | Spence et al. | Apr. 27, 1954 |
| 2,724,667 | MacPherson | Nov. 22, 1955 |
| 2,738,293 | Spence | Mar. 13, 1956 |

OTHER REFERENCES

"Comprehensive Treatise on Inorganic and Theoretical Chemistry," by Mellor, vol. 11, pages 244, 254 and 328, Longmans, Green & Co., N. Y. (1931).